US012756256B2

(12) United States Patent
Goertzen et al.

(10) Patent No.: US 12,756,256 B2
(45) Date of Patent: Oct. 6, 2026

(54) TOOLING FOR ENCAPSULATED ESP STATORS

(71) Applicant: Schlumberger Technology Corporation, Sugar Land, TX (US)

(72) Inventors: William Goertzen, Lawrence, KS (US); Varun Vinaykumar Nyayadhish, Nisku (CA); Jason Holzmueller, Lawrence, KS (US)

(73) Assignee: Schlumberger Technology Corporation, Sugar Land, TX (US)

( * ) Notice: Subject to any disclaimer, the term of this patent is extended or adjusted under 35 U.S.C. 154(b) by 211 days.

(21) Appl. No.: 18/689,606

(22) PCT Filed: Oct. 14, 2022

(86) PCT No.: PCT/US2022/046727

§ 371 (c)(1),
(2) Date: Mar. 6, 2024

(87) PCT Pub. No.: WO2023/064569

PCT Pub. Date: Apr. 20, 2023

(65) Prior Publication Data

US 2024/0396396 A1 Nov. 28, 2024

Related U.S. Application Data

(60) Provisional application No. 63/262,527, filed on Oct. 14, 2021.

(51) Int. Cl.
*H02K 3/44* (2006.01)
*E21B 43/12* (2006.01)
(Continued)

(52) U.S. Cl.
CPC ................ *H02K 3/44* (2013.01); *H02K 3/30* (2013.01); *H02K 15/12* (2013.01); *E21B 43/128* (2013.01); *F04D 13/10* (2013.01)

(58) Field of Classification Search
CPC ........ H02K 33/44; H02K 33/30; H02K 33/00; H02K 15/12; H02K 15/02; H02K 15/00;
(Continued)

(56) References Cited

U.S. PATENT DOCUMENTS 3,246,627 A 4/1966 Loeb
3,600,216 A 8/1971 Stewart
(Continued)

FOREIGN PATENT DOCUMENTS

CN 202339734 7/2012
CN 108028099 A 5/2018
(Continued)

OTHER PUBLICATIONS

Text Version of WO 2016089938 A1 (Year: 2016).*
(Continued)

*Primary Examiner* — Alexander A Singh
*Assistant Examiner* — Charlie Frank Mann, Jr.
(74) *Attorney, Agent, or Firm* — Kyle R. Miiller

(57) ABSTRACT

An in-situ fiber reinforced composite tooling for encapsulated ESP stators is provided. The tooling forms a cap or cover for the end turns of the stator windings.

20 Claims, 8 Drawing Sheets

(51) Int. Cl.
*F04D 13/10* (2006.01)
*H02K 3/30* (2006.01)
*H02K 15/12* (2025.01)

(58) Field of Classification Search
CPC ........ E21B 43/128; F04D 13/10; F04D 13/08; F04D 13/06; F04D 13/02; F04D 13/00
USPC .......................................................... 310/45
See application file for complete search history.

(56) References Cited

U.S. PATENT DOCUMENTS

| | | | | |
|---|---|---|---|---|
| 4,163,828 | A | 8/1979 | Mahoney | |
| 4,396,658 | A | 8/1983 | Mettes | |
| 4,412,028 | A | 10/1983 | Lundberg | |
| 5,075,174 | A | 12/1991 | Pyle | |
| 5,110,685 | A | 5/1992 | Cross | |
| 5,459,202 | A | 10/1995 | Martinez | |
| 5,461,107 | A | 10/1995 | Amin | |
| 5,490,319 | A * | 2/1996 | Nakamura | H02K 5/08 310/43 |
| 5,654,084 | A | 8/1997 | Egert | |
| 6,488,992 | B1 | 12/2002 | Boerio | |
| 6,863,124 | B2 | 3/2005 | Araux | |
| 7,373,991 | B2 | 5/2008 | Vaidya | |
| 7,455,106 | B2 | 11/2008 | Veneruso | |
| 7,714,231 | B2 | 5/2010 | Varkey | |
| 8,318,876 | B1 | 11/2012 | Larock | |
| 8,567,494 | B2 | 10/2013 | Rytlewski | |
| 8,604,656 | B2 | 12/2013 | Goertzen | |
| 8,776,359 | B2 | 7/2014 | Varkey | |
| 9,068,063 | B2 | 6/2015 | Helmer | |
| 9,214,842 | B2 * | 12/2015 | Noe | H02K 5/08 |
| 9,472,987 | B1 | 10/2016 | Hall | |
| 9,638,021 | B2 | 5/2017 | Varkey | |
| 2003/0127924 | A1 | 7/2003 | Van Dine | |
| 2005/0089419 | A1 | 4/2005 | Arauz | |
| 2006/0149005 | A1 | 7/2006 | Minaba | |
| 2007/0051510 | A1 | 3/2007 | Veneruso | |
| 2008/0111434 | A1 | 5/2008 | Head | |
| 2008/0191575 | A1 | 8/2008 | Varkey | |
| 2009/0091202 | A1 | 4/2009 | Parmeter | |
| 2009/0179506 | A1 * | 7/2009 | Saga | H02K 9/223 310/215 |
| 2010/0151242 | A1 | 6/2010 | Boehm | |
| 2012/0269660 | A1 | 10/2012 | Yin | |
| 2012/0282120 | A1 | 11/2012 | Krahn | |
| 2013/0131252 | A1 | 5/2013 | Fukumori | |
| 2013/0200745 | A1 * | 8/2013 | Knapp | H02K 3/522 310/214 |
| 2013/0278117 | A1 | 10/2013 | Parmeter | |
| 2014/0145530 | A1 | 5/2014 | Reeves | |
| 2014/0152155 | A1 | 6/2014 | Flett | |
| 2014/0158380 | A1 | 6/2014 | Varkey | |
| 2014/0159536 | A1 | 6/2014 | Flett | |
| 2016/0042836 | A1 | 2/2016 | Okabe | |
| 2016/0125972 | A1 | 5/2016 | Arii | |
| 2016/0233003 | A1 | 8/2016 | Caudill | |
| 2016/0294243 | A1 | 10/2016 | Duan | |
| 2016/0325994 | A1 | 11/2016 | Qu | |
| 2017/0037685 | A1 | 2/2017 | Strachan | |
| 2017/0372813 | A1 | 12/2017 | Parmeter | |
| 2018/0262074 | A1 | 9/2018 | Duan | |
| 2019/0119449 | A1 | 4/2019 | Sheth | |
| 2020/0028399 | A1 * | 1/2020 | Madbouly | E21B 47/008 |
| 2020/0032046 | A1 | 1/2020 | Osawa | |
| 2021/0202134 | A1 | 7/2021 | Jouanneau | |
| 2021/0288541 | A1 | 9/2021 | Madbouly | |
| 2023/0083970 | A1 | 3/2023 | Said | |

FOREIGN PATENT DOCUMENTS

| | | | | |
|---|---|---|---|---|
| EP | 18081825 | A2 | 3/2001 | |
| GB | 872743 | A | 7/1961 | |
| JP | 2001309599 | A | 11/2001 | |
| WO | 2013086079 | A1 | 6/2013 | |
| WO | 2014209737 | A1 | 12/2014 | |
| WO | 2016032469 | A1 | 3/2016 | |
| WO | 2016049244 | A1 | 3/2016 | |
| WO | WO-2016089938 | A1 * | 6/2016 | C09D 4/00 |
| WO | 2023064569 | A1 | 4/2023 | |

OTHER PUBLICATIONS

Lee, B. et al., "Thermally conductive and electrically insulating EVA composite encapsulants for solar photovoltaic (PV) cell", eXPRESS Polymer Letters, 2008, 2(5), pp. 357-363.

International Search Report and Written Opinion issued in the PCT Application PCT/US2015/063319 dated Feb. 26, 2016 (17 pages).

International Preliminary Report on Patentability issued in the PCT Application PCT/US2015/063319 dated Jun. 6, 2017 (14 pages).

International Search Report and Written Opinion issued in the PCT Application PCT/US2022/046727 dated Feb. 9, 2023 (11 pages).

Matejka et al., 1985, Polymerization of dicyclopentadiene: A new reaction injection molding system, J Appl Poly Sci 1985; 30: 2787-2803.

Grubbs, et al., "Ring-Opening Metathesis Polymerization Catalysts" Polymer Preprints, 35(1), p. 688 (1994).

Kessler et al., Self-activated healing of delamination damage in woven composites, Composites Part A 2001; 32: 683-99.

Brown et al., Fracture testing of a self-healing polymer composite, Exp Mech 2002; 42: 372-9.

Kessler et al., Cure kinetics of the ring-opening metathesis polymerization of dicyclopentadiene, J Polym Sci Part A Polym Chem 2002; 40: 2373-83.

Brown et al., Microcapsule induced toughening in a self-healing polymer composite, J Mater Sci 2004; 39: 1703-10.

Rule et al., Wax-Protected Catalyst Microspheres for Efficient Self-Healing Materials, JS. Adv Mater 2005; 17: 205-8.

Brown et al., Retardation and repair of fatigue cracks in a microcapsule toughened epoxy composite-Part II: In situ self-healing, Compos Sci Techol 2005; 65: 2474-80.

International Search Report and Written Opinion of the PCT Application No. PCT/US2022/046757 dated Feb. 22, 2023, 11 pages.

* cited by examiner

TOOLING FOR ENCAPSULATED ESP STATORS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is a National Stage Entry of International Application No. PCT/US2022/046727, filed Oct. 14, 2022, which claims priority benefit of U.S. Provisional Application No. 63/262,527, filed Oct. 14, 2021, the entirety of which is incorporated by reference herein and should be considered part of this specification.

BACKGROUND

Field

The present disclosure generally relates to electric submersible pumps, and more particularly to encapsulated ESP stators.

Description of the Related Art

Various types of artificial lift equipment and methods are available, for example, electric submersible pumps (ESPs). An ESP includes multiple centrifugal pump stages mounted in series, each stage including a rotating impeller and a stationary diffuser mounted on a shaft, which is coupled to a motor. In use, the motor rotates the shaft, which in turn rotates the impellers within the diffusers. Well fluid flows into the lowest stage and passes through the first impeller, which centrifuges the fluid radially outward such that the fluid gains energy in the form of velocity. Upon exiting the impeller, the fluid flows into the associated diffuser, where fluid velocity is converted to pressure. As the fluid moves through the pump stages, the fluid incrementally gains pressure until the fluid has sufficient energy to travel to the well surface.

SUMMARY

In some configurations, a stator for an electric submersible pump includes electrically conductive windings; a polymeric composite material disposed about at least a portion of the electrically conductive winding; and an in-situ fiber reinforced composite tooling covering a portion of the polymeric composite material disposed about end turns of the electrically conductive windings.

The tooling can include a fiber reinforced epoxy or phenolic. The tooling can include glass, quartz, carbon, and/or aramid. The epoxy or phenolic can include a compatibilizing agent configured to enhance compatibility of the tooling with the polymeric composite material. The tooling can include a compatibilizing surface treatment configured to enhance compatibility of the tooling with the polymeric composite material.

In some configurations, an in-situ cover configured for use in a stator of an electric submersible pump includes a fiber reinforced epoxy or phenolic compound.

The fibers can be electrically non-conductive. The fibers can include one or more of: glass, quartz, carbon, and aramid. The cover can include a compatibilizing agent in the compound that is configured to enhance compatibility of the cover with encapsulation resin of the stator. The compatabilizing agent can crosslink into the compound. The compatibilizing agent can include epoxidized or phenolic functionalized versions of the encapsulation resin. The cover can include a compatibilizing surface treatment configured to enhance compatibility of the cover with encapsulation resin of the stator. The surface treatment can be formed via chemical etching, plasma treatment, CVS, or application of primers. The cover can have a hollow tube portion and a flange extending radially outward from an end of the hollow tube portion. The flange can be configured to cover an uphole end of an end turn area of the stator, and the hollow tube portion can be configured to extend downwards such that encapsulated end turns of the stator are disposed radially between the hollow tube portion and a housing of the stator.

In some configurations, a method of manufacturing an electric submersible pump includes manufacturing a stator. Manufacturing the stator includes forming a cover for an end turns area of the stator, the cover comprising a fiber reinforced epoxy or phenolic compound; encapsulating stator windings in the end turns area with encapsulating resin; and curing the encapsulating resin using the cover as a mold to create a rotor space circumferentially within the stator. The method includes inserting a rotor within the rotor space.

Forming the cover can include including a compatibilizing agent in the fiber reinforced epoxy or phenolic compound. The compatibilizing agent is configured to enhance compatibility of the cover with the encapsulating resin. Forming the cover can include forming a compatibilizing surface treatment on the cover. The compatibilizing surface treatment is configured to enhance compatibility of the cover with the encapsulating resin. Forming the surface treatment can include activating a surface of the cover via treatment in a plasma chamber to generate surface hydroxyl groups and dipping or brushing the cover with a solvent carried silane material having compatibility with the encapsulating resin.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure.

These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Figure 1:
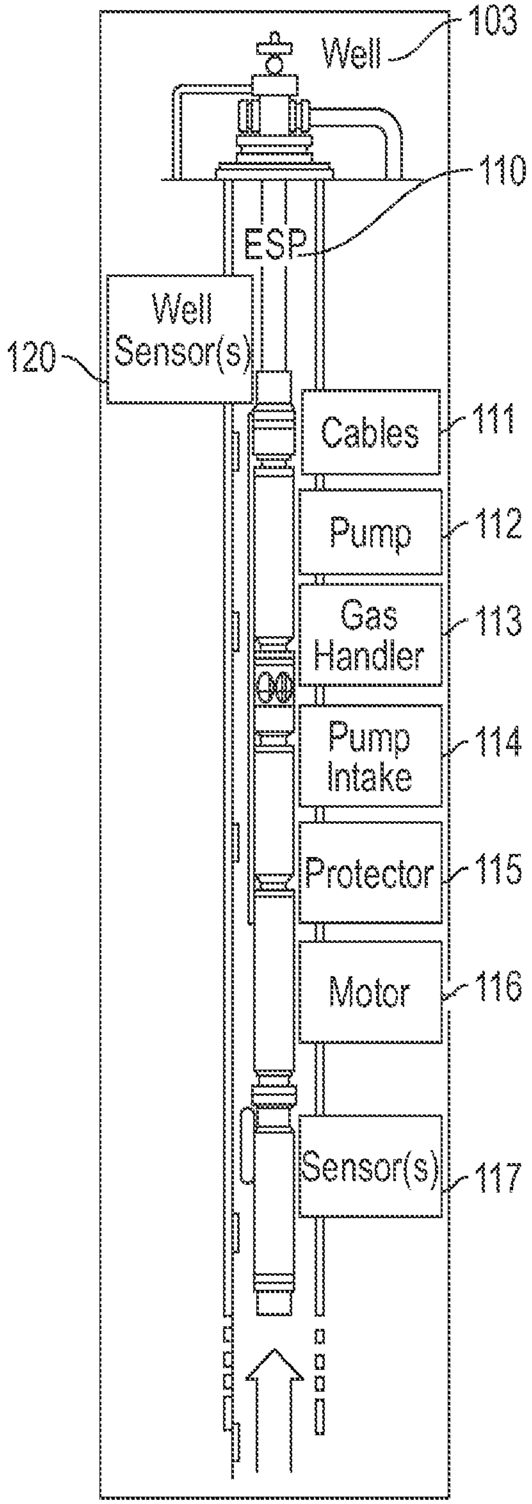
FIG. 1 shows a schematic of an electric submersible pump (ESP) system.

Various types of artificial lift equipment and methods are available, for example, electric submersible pumps (ESP). As shown in the example embodiment of FIG. 1, an ESP 110 typically includes a motor 116, a protector 115, a pump 112, a pump intake 114, and one or more cables 111, which can include an electric power cable. The motor 116 can be powered and controlled by a surface power supply and controller, respectively, via the cables 111. In some configurations, the ESP 110 also includes gas handling features 113 and/or one or more sensors 117 (e.g., for temperature, pressure, current leakage, vibration, etc.). As shown, the well 103 may include one or more well sensors 120.

The pump 112 includes multiple centrifugal pump stages mounted in series within a housing. Each stage includes a rotating impeller and a stationary diffuser. A shaft extends through the pump (e.g., through central hubs or bores of the impellers and diffusers) and is operatively coupled to the motor 116. The shaft can be coupled to the protector 115 (e.g., a shaft of the protector), which in turn can be coupled to the motor 116 (e.g., a shaft of the motor). The impellers are rotationally coupled, e.g., keyed, to the shaft. The diffusers are coupled, e.g., rotationally fixed, to the housing. In use, the motor 116 causes rotation of the shaft (for example, by rotating the protector 115 shaft, which rotates the pump shaft), which in turn rotates the impellers relative to and within the stationary diffusers.

In use, well fluid flows into the first (lowest) stage of the ESP 110 and passes through an impeller, which centrifuges the fluid radially outward such that the fluid gains energy in the form of velocity. Upon exiting the impeller, the fluid makes a sharp turn to enter a diffuser, where the fluid's velocity is converted to pressure. The fluid then enters the next impeller and diffuser stage to repeat the process. As the fluid passes through the pump stages, the fluid incrementally gains pressure until the fluid has sufficient energy to travel to the well surface.

Figure 2:
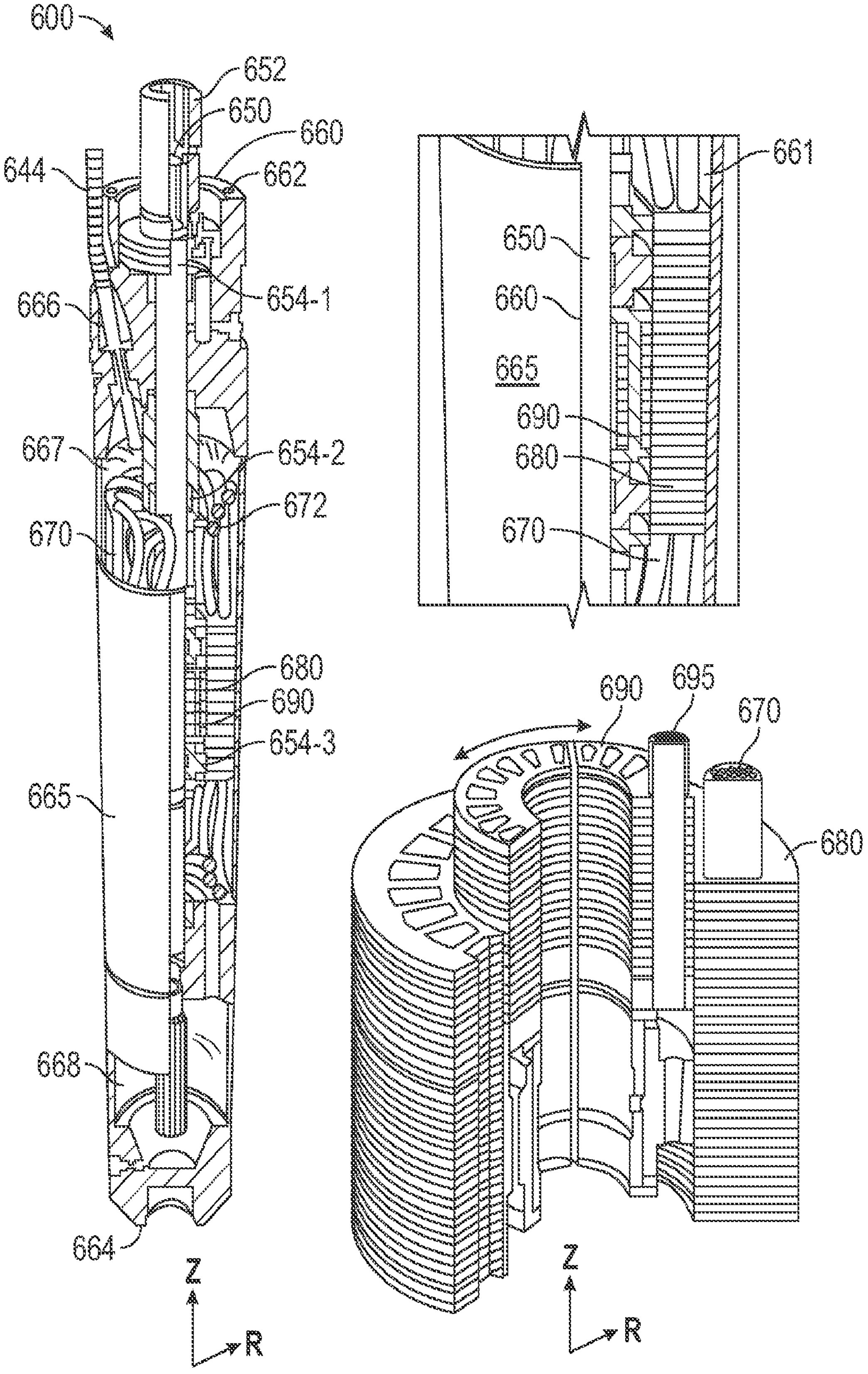
FIG. 2 shows a perspective cut-away view of an example of a motor assembly.

FIG. 2 shows a perspective cut-away view of an example motor assembly 600. As shown, the motor assembly 600 can include a power cable 644 (e.g., MLEs, etc.) to supply energy, a shaft 650, a housing 660 that may be made of multiple components (e.g., multiple units joined to form the housing 660), stacked laminations 680, stator windings 670 of wire (e.g., magnet wire), and rotor laminations 690 and rotor windings 695 coupled to the shaft 650 (e.g., rotatably driven by energizing the stator windings 670).

As shown in FIG. 2, the housing 660 includes an inner surface 661 and an outer surface 665. The housing 660 can define one or more cavities via its inner surface 661. One or more of the cavities may be hermetically sealed. Such a cavity may be filled at least partially with dielectric oil. The dielectric oil may be formulated to have a desired viscosity and/or viscoelastic properties, etc.

As shown, the shaft 650 may be fitted with a coupling 652 to couple the shaft to another shaft. A coupling may include, for example, splines that engage splines of one or more shafts. The shaft 650 may be supported by bearings 654-1, 654-2, 654-3, etc. disposed in the housing 660. The shaft may be reciprocating, for example, where a shaft includes one or more magnets (e.g., permanent magnets) that respond to current that passes through stator windings.

As shown, the housing 660 includes opposing axial ends 662 and 664 with the substantially cylindrical outer surface 665 extending therebetween. The outer surface 665 can include one or more sealable openings for passage of oil (e.g., dielectric oil), for example, to lubricate the bearings and to protect various components of the motor assembly 600. In some configurations, the motor assembly 600 may include one or more sealable cavities. For example, a passage 666 allows for passage of one or more conductors of the cable 644 (e.g., or cables) to a motor cavity 667 of the motor assembly 600 where the motor cavity 667 may be a sealable cavity. As shown, the motor cavity 667 houses the stator windings 670 and the stator laminations 680. In some configurations, an individual winding may include a plurality of conductors (e.g., magnet wires). For example, a cross-section 672 of an individual winding may reveal a plurality of conductors that are disposed in a matrix (e.g., of material or materials) or otherwise bound together (e.g., by a material or materials). In the example of FIG. 2, the motor housing 660 includes an oil reservoir 668, for example, that may include one or more passages (e.g., a sealable external passage and a passage to the motor cavity 667) for passage of oil.

In some configurations, a polymeric matrix may be formed of organic and/or inorganic monomeric and/or polymeric materials. For example, one or more of an epoxy, bismaleimide, polybutadiene, benzoxazine, cyanate ester, silicone, Ring-Opening Metathesis Polymers (ROMP), and preceramic polymers may be utilized. One or more monomers and/or polymers may be amphiphilic, which may facilitate blending in one or more fillers. For example, the functionalized linseed oil marketed as DILULIN™ material (Cargill, Inc., Wayzata, Minnesota) is amphiphilic and can allow for increasing content of one or more inorganic fillers of a composite material. Where DILULIN™ material is mentioned, a functionalized linseed oil other than that marketed as DILULIN™ may optionally be utilized.

In some configurations, a polymeric material can be thermally conductive and electrically insulative and be utilized to encapsulate windings of an electric motor. Such an approach may provide for lower winding temperatures and end coil temperatures through heat dissipation.

An electric motor may include a coil retention system such as, for example, a full winding encapsulation type, a varnished windings type, or an end coil retention type (e.g., one that does not support wires in slots). In some configurations, a glass-fiber tape can be included in a coil retention system where, for example, the glass-fiber tape is wrapped around end turns and where the glass-fiber tape is impregnated with a crosslinking resin.

An encapsulation technique can depend on the type of coil retention system employed. For example, the use of a thermosetting polymer can depend on the type of coil retention system. An encapsulated system can involve use of one or more materials and one or more particular processes. As an example, a varnished windings approach can include use of a solvent-based polybutadiene system, which tends to be more elastomeric than structural. An end coil retention resin can be a silica-filled epoxy, which has suitable structural properties due in part to the fact that the end coil retention provides coil stabilization while holding the end turns and while not supporting wires in the slots.

To maintain mechanical robustness of magnet wire wrapped in a stator of an electric motor, insulated motor windings may use a coil retention system where at least ends of coils are held in place by a structural composite that includes fibrous reinforcement (e.g., one or more of glass, quartz, aramid, etc.) and an organic and/or inorganic polymer matrix.

Dielectric fluids (e.g., motor oils, etc.), can include, for example, one or more of purified mineral oils, polyalphaolefin (PAO) synthetic oils, PFPE (polyperfluoroether), etc. Such dielectric fluids can be relatively resistant to well fluid(s), which can thereby allow an electric motor to function in case of leakage of well fluid.

Figure 3:
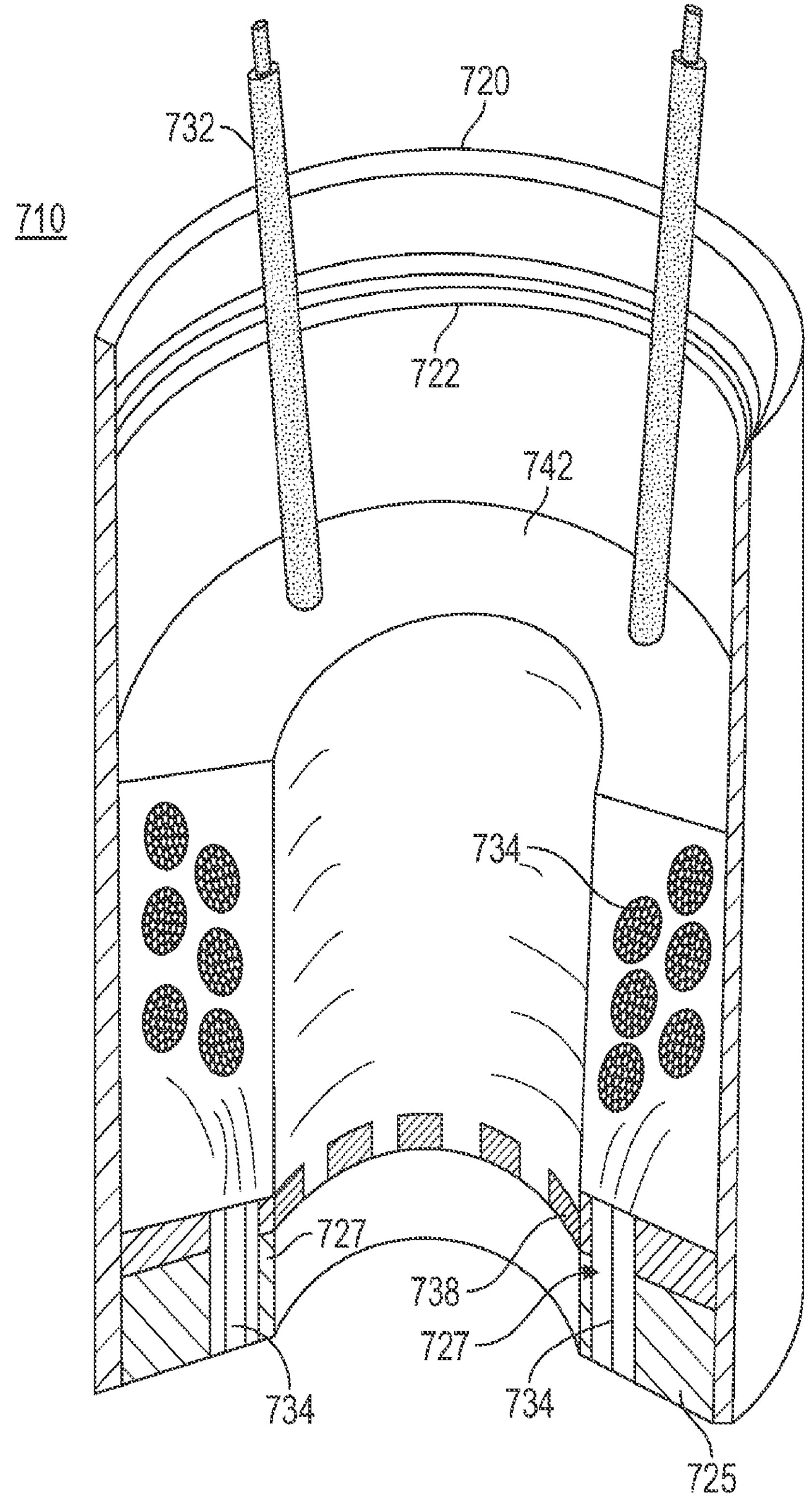
FIG. 3 shows an example electric motor.

As shown in FIG. 3, an electric motor 710 includes a housing 720 with threads 722. Lead wires (e.g., brush wires) 732 are shown, where a number of such wires can correspond to a number of phases. For example, for a three phase electric motor, there can be three lead wires 732 (e.g., two being shown in the cutaway view). The lead wires 732 can be associated with a top or uphole end of an electric motor; whereas, at a bottom or downhole end, a wye point may exist where phases are electrically coupled. As an example, a wye point may be electrically coupled to one or more other components such as, for example, a gauge (e.g., a sensor unit, etc.).

As shown in the example of FIG. 3, the lead wires 732 are electrically coupled to phase windings or phase coils 734 in the end turns area. In the end turns area, the windings or coils 734 can extend or be coiled generally circumferentially. The windings or coils 734 can extend from the end turns axially downward through slots 727 in stator laminations 725. As shown in the example of FIG. 3, a polymeric material 742, which may optionally be a polymeric composite material (e.g., polymeric material that includes one or more fillers), contacts the ends of the windings or coils 734. In other words, the polymeric material 742 can surround or encapsulate the windings or coils 734 in the end turns area. A portion of the polymeric material 742 can extend downwardly through the slots 727 in the laminations 725.

In the example of FIG. 3, a molding insert may be utilized to contain the polymeric material 742 (e.g. encapsulant material) during curing of the polymeric material (e.g., where reactions occur involving at least in part monomers, etc.).

In some configurations, a method can include an injection process for injecting the polymeric material 742 into a cavity of the housing 720 to contact ends of windings or coils 734 (e.g., of magnet wire), a molding process for molding the polymeric material 742 about the ends of the windings or coils in a manner to not interfere with other components of an electric motor (e.g., to create a shaft space and/or rotor space, etc.), an assembly process for assembling an electric motor 710 that includes the stator disposed in the housing 720, an assembly process for assembly of a downhole tool that can utilize the electric motor 710 (e.g., an ESP, etc.), or any one or combination of the aforementioned processes.

Figure 4:
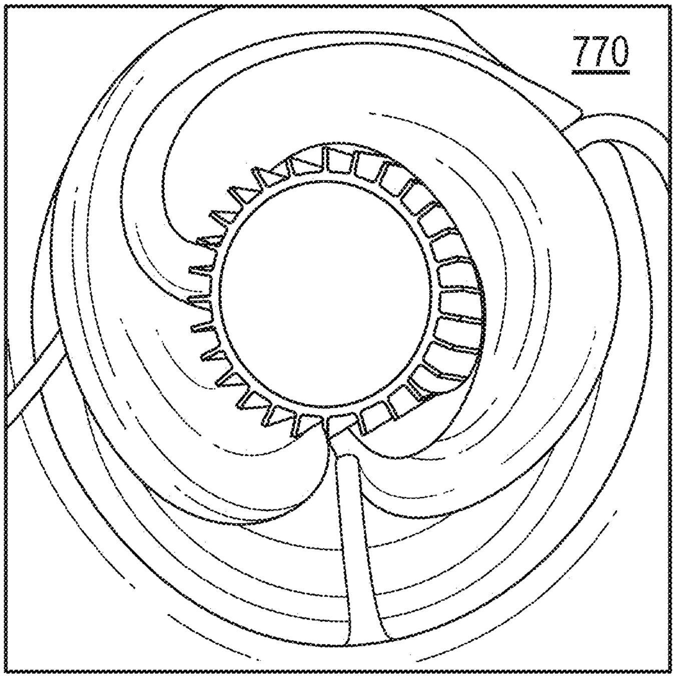
FIG. 4 shows a photograph of a portion of an electric motor.

FIG. 4 shows a photograph 770 of a portion of an electric motor where resin is applied to glass fabric for the lower portion of the windings shown in the photograph 770 (e.g., upper portion shows the glass fabric without the resin). As an example, windings can be held in place by a polymeric material (e.g., optionally a polymeric composite material) that completely encapsulates end turns and that fills slots. In such an example, air voids may be substantially removed through use of vacuum impregnation and degassing while prepolymer is heated to a low viscosity prior to gelation.

Thermally conductive encapsulants can improve reliability of ESP systems by decreasing motor winding temperatures. Applications can include SAGD, subsea, geothermal, etc. Such materials may be suitable for use in equipment for drilling and measurement operations (e.g., D&M).

Figure 5:
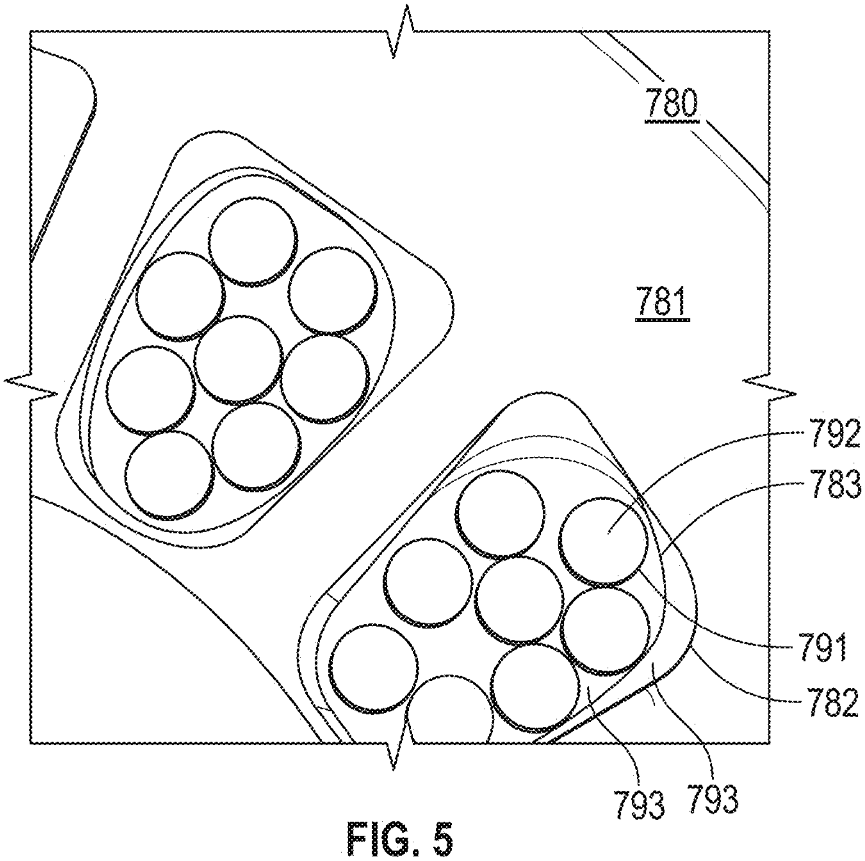
FIG. 5 shows a portion of an electric motor.

FIG. 5 shows a photograph 780 of an example of a portion of a product (e.g., a portion of an example of a stator). In particular, the photograph 780 shows a lamination 781 that includes a slot 782 where slot liner material 783 defines an interior space such that the slot liner material 783 surrounds magnet wire 792 that includes insulation 791. As shown in the photograph 780, polymeric material 793, which may be polymeric composite material, is disposed exteriorly and interiorly with respect to the slot liner material 783. In some configurations, the insulation 791 can be of the order of about 0.1 mm to about 0.3 mm. The slot liner material 783 can be a polymeric film that may be of one or more layers, where a layer of the film may be of the order of about 0.1 mm to about 0.3 mm. As shown, the polymeric material 793 can at least partially fill spaces defined by the slot 782 of the lamination 781. In some configurations, an individual plate may be formed of carbon steel with an oxide coating, and a plurality of such plates can be stacked to form the laminations 781.

As an example, heat energy generated during operation of an electric motor that includes the stator of the photograph 780 may be transferred to the polymeric material 793. For example, current in the magnet wire 792 can generate heat due at least in part to resistance of the magnet wire 792. As the polymeric material 793 is in contact with the magnet wire 792 (e.g., via the electrical insulation 791) it can conduct at least a portion of the heat energy away from the magnet wire 792, noting that resistance of the magnet wire 792 may depend on temperature (e.g., consider a wire where resistance increases with temperature or, in other words, where the wire becomes less efficient as temperature increases).

As described herein, stator windings in an ESP motor must be secured mechanically due to their significant weight and axially-biased orientation. Otherwise, the windings can shift vertically during deployment or operation, causing electrical failure. Historically, ESP stator windings have been secured by varnish (coated over all wires and end turns), composite end coil retention systems (covering only the end turns), or fully encapsulated windings. Resin chemistries used for encapsulated windings can advantageously offer low viscosity processing, high glass transition temperatures, excellent electrical, mechanical, and/or thermal properties, and/or hydrolysis resistant chemistries.

Currently, encapsulated ESP stators are used in applications up to 204 °C (400 °F). However, for geothermal ESP applications, the materials must be able to be used at temperatures up to 300 °C (572 °F). There are significant challenges with the use of encapsulation in this temperature range. Material formulation is key for stability at these temperatures. The ability of the material to withstand differential thermal expansion with extreme thermal excursions is a significant challenge. Differences in the coefficient of thermal expansion between the cured encapsulant and the metallic portions of the stator can cause significant mechanical stresses in the encapsulant, which can lead to cracking of the material.

Cracking of the encapsulant material can lead to mechanical failure in the ESP if the encapsulant material cracks in such a way that debris enters the system, causing bearing failure. The risk is primarily in the end turns area, where the material is exposed. One way to mitigate or reduce this risk is via a material formulation with a very low coefficient of thermal expansion, to reduce thermal stresses due to the differential. However, material formulation alone is unlikely to fully mitigate the cracking risk.

The present disclosure provides an in-situ fiber reinforced composite cover tooling to protect and mitigate against cracking encapsulant in the end turns area. The cover tooling is designed to cover all of the encapsulant material in the end turns, lock in place, and reduce or eliminate the risk of debris, even in the event of material cracking. Even if the encapsulant material cracks, it can still provide heat dissipation and secondary insulation to the windings.

Figure 6:
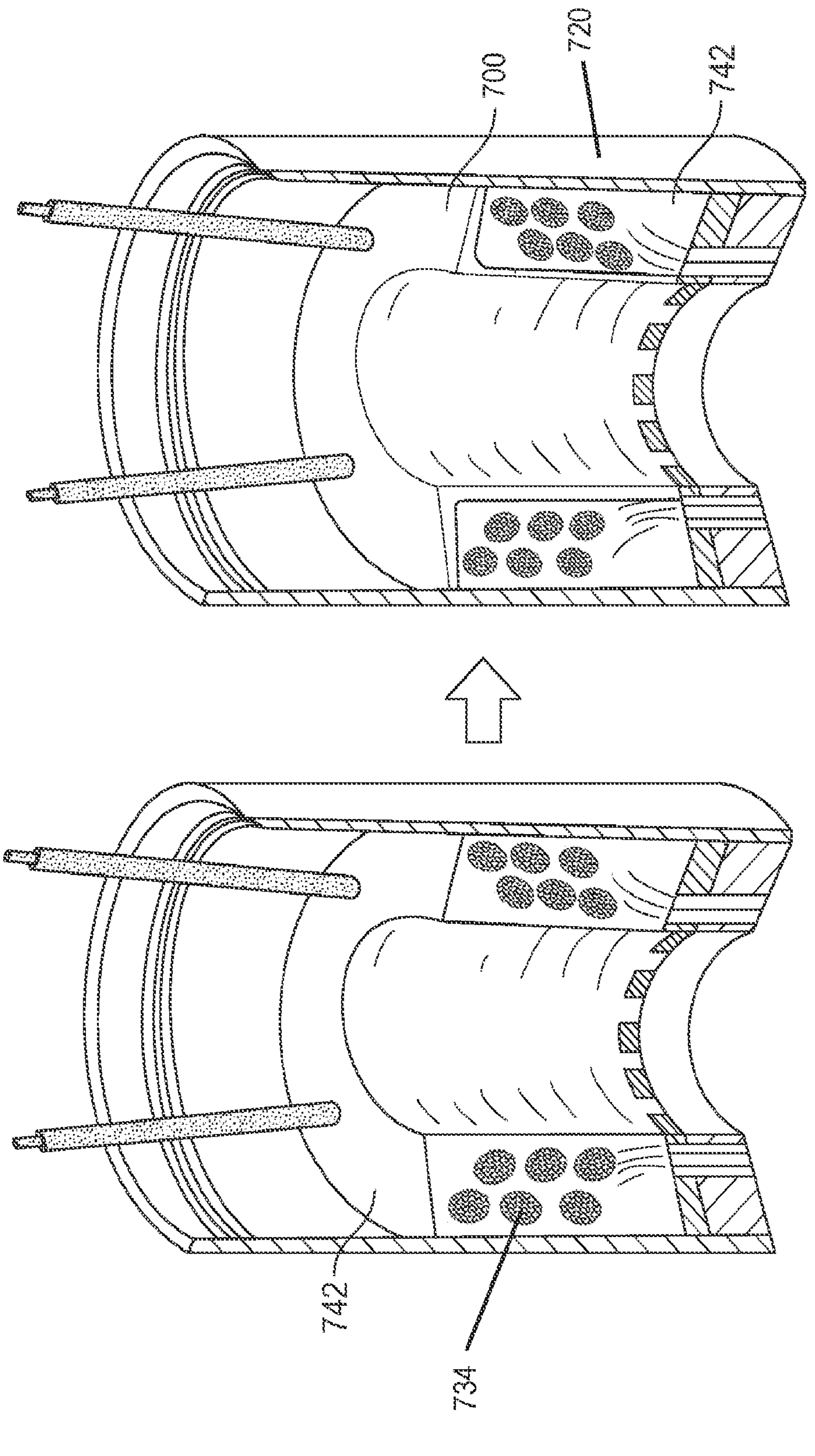
FIG. 6 shows an in-situ fiber reinforced composite tooling for an encapsulated ESP stator.

The left of FIG. 6 shows the end turn area of a currently available ESP stator. As shown, encapsulant 742 surrounds the end turns of the windings 734. During manufacturing, tooling is used to mold this shape in the end turns, and the encapsulant material is cured within the tooling mold. The tooling is later removed to expose the encapsulated end turns.

The right of FIG. 6 shows an in-situ composite cover 700 according to the present disclosure. The composite cover 700 acts as in-situ tooling, providing the mold for the encapsulant during curing. However, in this case, the tooling remains in place during use, in the form of the composite cover or cap 700.

Some existing end caps use a molded thermoplastic (e.g., Ryton® (Polyphenylene Sulfide, or PPS)). However, this material has inherent temperature limitations and would melt at temperatures seen in geothermal applications. PEEK (or Polyetheretherketone) has higher temperature resistance, but low thermal conductivity and a high coefficient of thermal expansion. Furthermore, the glass transition temperature (Tg) of PEEK is only 149 °C, further increasing thermal expansion and decreasing modulus and strength. Polyimides, such as those available under the trade name Vespel®, have high-temperature capability, but are extremely limited in hydrolysis resistance, and will therefore crack after high temperature exposure, even with small amounts of water present, such as moisture absorbed in the oil.

Composite covers 700 according to the present disclosure are made of or include a fiber reinforced epoxy or phenolic. These materials are superior in mechanical properties and thermal conductivity. Furthermore, the polymer matrices can be selected for extreme temperature resistance. Fiber reinforcement can be in the form of glass, quartz, carbon, and/or aramid. Preferably, the fibers are electrically non-conductive (and therefore not carbon fiber). In some configurations, the composite material of the cover 700 is made of sheets of fabric impregnated with resin. The fibers of the fabric can have specific orientations or be random oriented chopped or long fibers.

Composite covers 700 according to the present disclosure can be manufactured in a way to enhance compatibility with the encapsulation resin. By enhancing compatibility with the encapsulation resin, the resin will exhibit superior wet-out on the cover surface, greatly reducing the likelihood of void or bubble formation during the encapsulation process. Enhanced compatibility can also result in some degree of adhesion, which can greatly enhance the mechanical strength of the cover.

Two possible techniques to enhance the compatibility of the cover 700 include use of a compatibilizing agent in the phenolic or epoxy compound and use of a compatibilizing surface treatment on the cover material. For use of a compatibilizing agent in the phenolic or epoxy compound, the agent will have a compatibility with the encapsulating resin, but will also crosslink into the cover material. An example of such an agent is epoxidized or phenolic functionalized versions of the encapsulating resin being used. Use of a compatibilizing surface treatment on the cover material can be achieved with chemical etching, plasma treatments, CVD, or application of primers. An example method includes activating the surface of the cover via treatment in a plasma chamber to generate surface hydroxyl groups, following by dipping or brushing with a solvent carried silane material that exhibits good compatibility with the encapsulation resin.

Figure 7:
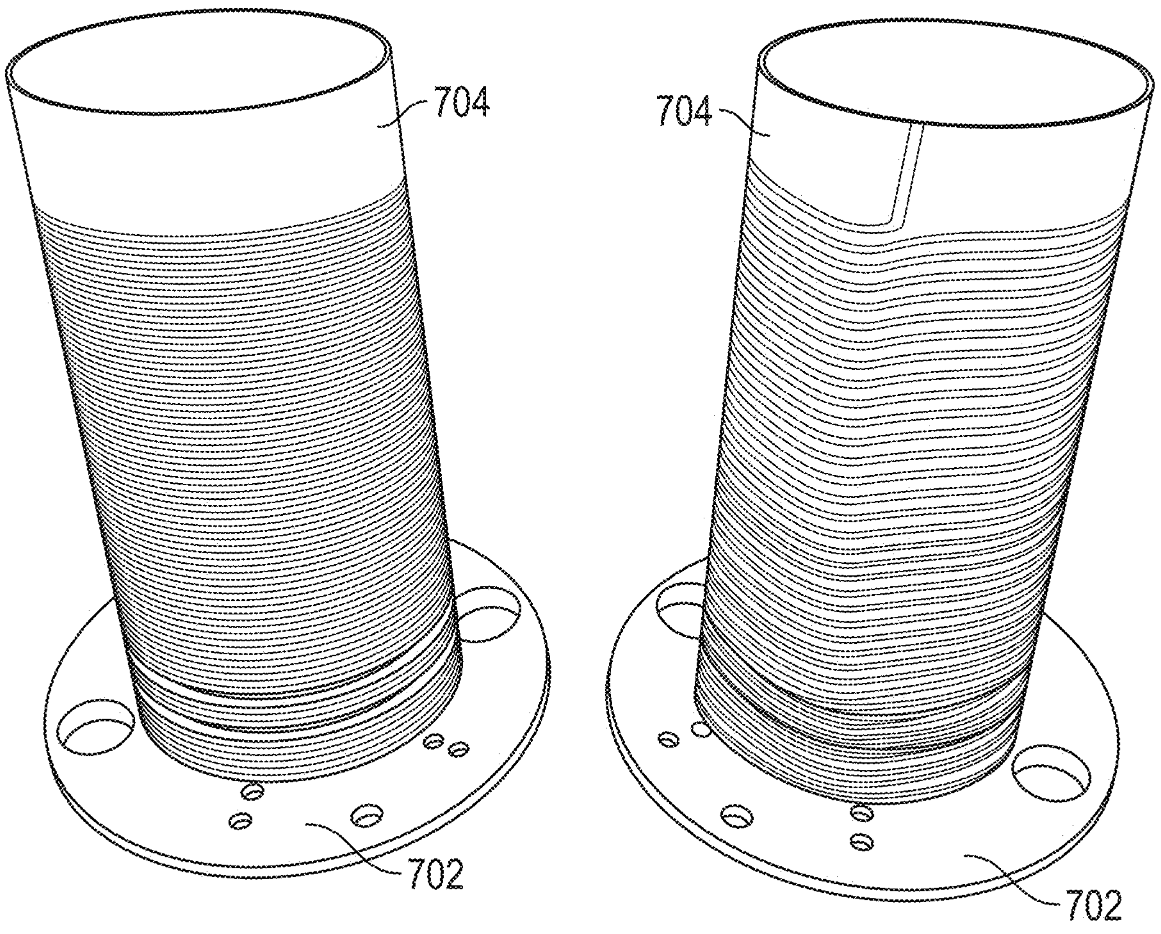
FIGS. 7-9 illustrate example composite covers or caps.
Figure 8:
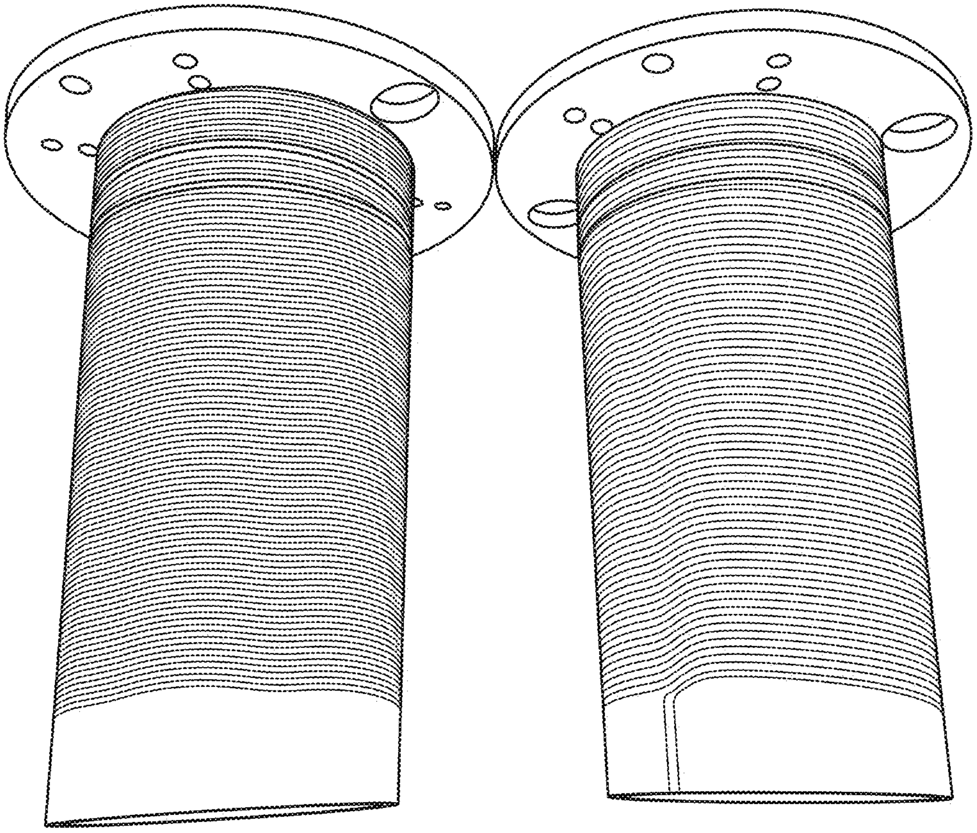
Figure 9:
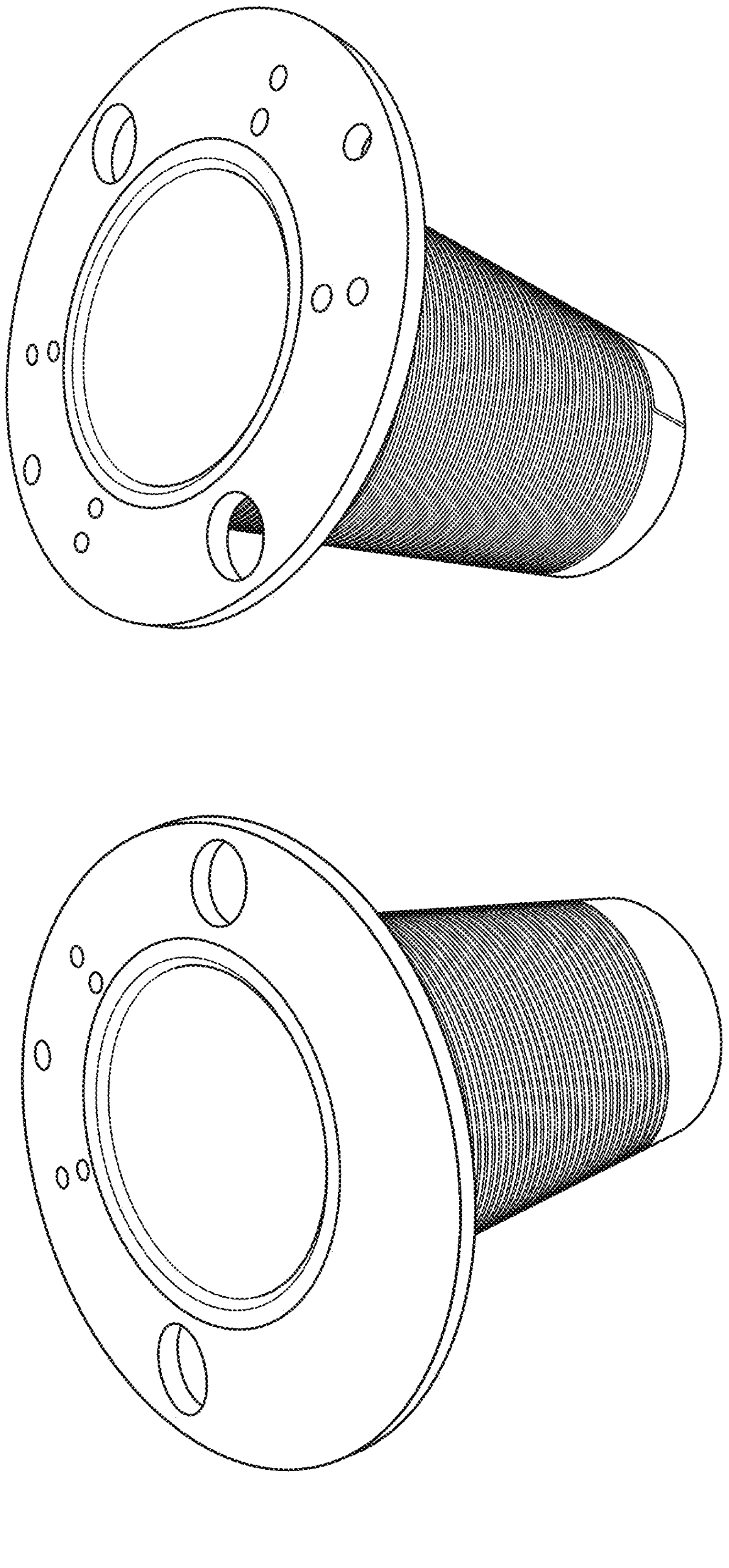

FIGS. 7-9 illustrate example composite covers or caps according to the present disclosure. The left example cap is a glass-reinforced epoxy, and the right example is a glass reinforced phenolic.

As shown in FIGS. 6-9, a cap or cover 700 according to the present disclosure can include a flange 702 portion projecting radially outward from an end of a hollow tube 704. The flange portion can be positioned on or adjacent the top end or surface of the encapsulant material 742, as shown in FIG. 6. The encapsulant material 742, and encapsulated end coils 734 are positioned radially between the hollow tube 704 of the cap and the housing 720. The cover 700, specifically the hollow tube 704 of the cover 700, can at least partially define a rotor space into which the rotor of the motor is inserted.

In some configurations, a method of manufacturing an electric submersible pump motor includes manufacturing a stator of the motor. Manufacturing the stator can include forming the cover 700 for the end turns area. As described herein, the cover 700 can be made of or include a fiber reinforced epoxy or phenolic compound. Manufacturing the stator can further include encapsulating the stator windings 734 in the end turns area with encapsulating resin and curing the encapsulating resin using the cover 700 as a mold to create a rotor space circumferentially within the stator. The cover 700 at least partially defines the rotor space. Manufacturing the motor can further include inserting a rotor into the rotor space.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A stator for an electric submersible pump, the stator comprising:

electrically conductive windings having an end turns area;

a first material disposed about at least the end turns area of the electrically conductive windings; and a cover comprising a second material covering a portion of the first material disposed about at least the end turns area of the electrically conductive windings, wherein the first material and the second material are different from one another, and the second material comprises at least one of:

a compatibilizing agent in the second material, the compatibilizing agent configured to enhance compatibility of the cover with the first material; or a compatibilizing surface treatment on the cover, the compatibilizing surface treatment configured to enhance compatibility of the cover with the first material.

2. The stator of claim 1, wherein the first material comprises an encapsulating resin, and the second material comprises a fiber reinforced epoxy or phenolic compound.

3. The stator of claim 2, wherein the second material comprises glass, quartz, carbon, or aramid.

4. The stator of claim 1, wherein the second material comprises the compatibilizing agent configured to enhance compatibility of the cover with the first material.

5. The stator of claim 1, wherein the second material comprises the compatibilizing surface treatment configured to enhance compatibility of the cover with the first material.

6. The stator of claim 1, wherein the first material comprises a polymeric composite material, the second material comprises a fiber reinforced composite material, and the cover having the fiber reinforced composite material structurally reinforces the first material.

7. A cover configured for use in a stator of an electric submersible pump, the cover comprising:

a fiber reinforced epoxy or phenolic compound, wherein the cover comprises at least one of:

a compatibilizing agent in the fiber reinforced epoxy or phenolic compound, the compatibilizing agent configured to enhance compatibility of the cover with an encapsulating resin that encapsulates stator windings in an end turns area; or a compatibilizing surface treatment on the cover, the compatibilizing surface treatment configured to enhance compatibility of the cover with the encapsulating resin.

8. The cover of claim 7, wherein fibers of the fiber reinforced epoxy or phenolic compound are electrically non-conductive.

9. The cover of claim 7, wherein fibers of the fiber reinforced epoxy or phenolic compound comprise one or more of glass, quartz, carbon, or aramid.

10. The cover of claim 7, further comprising the compatibilizing agent in the fiber reinforced epoxy or phenolic compound, the compatibilizing agent configured to enhance compatibility of the cover with the encapsulating resin that encapsulates the stator windings in the end turns area of the stator.

11. The cover of claim 10, wherein the compatibilizing agent crosslinks into the fiber reinforced epoxy or phenolic compound.

12. The cover of claim 10, wherein the compatibilizing agent comprises epoxidized or phenolic functionalized versions of the encapsulating resin.

13. The cover of claim 7, further comprising the compatibilizing surface treatment on the cover, the compatibilizing surface treatment configured to enhance compatibility of the cover with the encapsulating resin that encapsulates the stator windings in the end turns area of the stator.

14. The cover of claim 13, wherein the compatibilizing surface treatment is formed via chemical etching, plasma treatment, CVD, or application of primers.

15. The cover of claim 7, the cover comprising a hollow tube portion and a flange extending radially outward from an end of the hollow tube portion, the flange configured to cover an uphole end of the end turns area, and the hollow tube portion configured to extend downwards such that encapsulated end turns of the stator are disposed radially between the hollow tube portion and a housing of the stator.

16. A stator for an electric submersible pump, the stator comprising the cover of claim 7, the stator having the encapsulating resin that encapsulates the stator windings in the end turns area, and the cover extending over a portion of the encapsulating resin in the end turns area.

17. A method of manufacturing an electric submersible pump, the method comprising:

manufacturing a stator of the electric submersible pump, wherein manufacturing the stator comprises:

forming a cover for an end turns area of the stator, the cover comprising a fiber reinforced epoxy or phenolic compound, wherein forming the cover comprises at least one of:

including a compatibilizing agent in the fiber reinforced epoxy or phenolic compound, the compatibilizing agent configured to enhance compatibility of the cover with an encapsulating resin; or forming a compatibilizing surface treatment on the cover, the compatibilizing surface treatment configured to enhance compatibility of the cover with the encapsulating resin;

encapsulating stator windings in the end turns area with the encapsulating resin; and curing the encapsulating resin using the cover as a mold to create a rotor space circumferentially within the stator; and inserting a rotor within the rotor space.

18. The method of claim 17, wherein forming the cover comprises including the compatibilizing agent in the fiber reinforced epoxy or phenolic compound, the compatibilizing agent configured to enhance compatibility of the cover with the encapsulating resin.

19. The method of claim 17, wherein forming the cover comprises forming the compatibilizing surface treatment on the cover, the compatibilizing surface treatment configured to enhance compatibility of the cover with the encapsulating resin.

20. The method of claim 19, wherein forming the compatibilizing surface treatment comprises activating a surface of the cover via treatment in a plasma chamber to generate surface hydroxyl groups and dipping or brushing the cover with a solvent carried silane material having compatibility with the encapsulating resin.

* * * * *